US011984761B1

(12) United States Patent
Berdut-Teruel

(10) Patent No.: US 11,984,761 B1
(45) Date of Patent: May 14, 2024

(54) BLOCK-TYPE WINDINGS FOR IMPROVED ELECTRICAL GENERATORS

(71) Applicant: Elberto Berdut-Teruel, San Juan, PR (US)

(72) Inventor: Elberto Berdut-Teruel, San Juan, PR (US)

(*) Notice: Subject to any disclaimer, the term of this patent is extended or adjusted under 35 U.S.C. 154(b) by 0 days.

(21) Appl. No.: 18/223,088

(22) Filed: Jul. 18, 2023

Related U.S. Application Data

(60) Provisional application No. 63/451,664, filed on Mar. 13, 2023.

(51) Int. Cl.
| | |
|---|---|
| H02K 1/02 | (2006.01) |
| H02K 1/14 | (2006.01) |
| H02K 1/278 | (2022.01) |
| H02K 1/28 | (2006.01) |
| H02K 21/16 | (2006.01) |

(52) U.S. Cl.
CPC .............. *H02K 1/02* (2013.01); *H02K 1/146* (2013.01); *H02K 1/278* (2013.01); *H02K 1/28* (2013.01); *H02K 21/16* (2013.01)

(58) Field of Classification Search
CPC .......... H02K 1/02; H02K 1/146; H02K 1/278; H02K 1/28; H02K 21/16
USPC ......................................................... 310/43
See application file for complete search history.

(56) References Cited

U.S. PATENT DOCUMENTS

| | | | | |
|---|---|---|---|---|
| 3,700,944 | A * | 10/1972 | Heintz | H02K 19/103 310/112 |
| 5,821,710 | A * | 10/1998 | Masuzawa | H02K 29/08 318/400.14 |
| 8,358,044 | B2 * | 1/2013 | Waszak | H02K 1/16 310/266 |
| 8,487,504 | B2 * | 7/2013 | Berdut Teruel | H02K 49/108 310/156.01 |
| 10,063,118 | B2 * | 8/2018 | Yoshida | H02K 3/48 |
| 11,043,879 | B2 * | 6/2021 | Rubin | H02P 23/14 |
| 2009/0051233 | A1 * | 2/2009 | Scott | H02K 21/24 310/156.01 |
| 2011/0074231 | A1 * | 3/2011 | Soderberg | H01F 3/10 335/297 |
| 2012/0091832 | A1 * | 4/2012 | Soderberg | C22C 33/02 310/156.01 |
| 2012/0194019 | A1 * | 8/2012 | Berdut Teruel | H02K 49/065 310/80 |
| 2014/0049127 | A1 * | 2/2014 | Berdut-Teruel | H02K 49/04 310/80 |
| 2014/0265698 | A1 * | 9/2014 | Tseng | H02K 1/187 310/156.02 |
| 2015/0200575 | A1 * | 7/2015 | Tsuiki | H02K 15/085 310/203 |
| 2017/0025922 | A1 * | 1/2017 | Jian | F03D 9/25 |
| 2017/0126087 | A1 * | 5/2017 | Soderberg | H02K 1/2792 |

(Continued)

*Primary Examiner* — Alex W Mok
(74) *Attorney, Agent, or Firm* — Luis Figarella

(57) ABSTRACT

Enhanced composite lightweight coiled windings are discussed which utilize phenolic, non-ferrous and ferrous metals in combination with improved geometrical shapes to create lightweight and highly efficient composite material winding assemblies for use in generators. These generators exhibit improved thermal and energy efficiencies when compared to present day generators. In some embodiments, the ends of these permanent magnets are in contact with intermediate T-shaped ferrous magnetically permeable members as described.

12 Claims, 6 Drawing Sheets

(56) References Cited

U.S. PATENT DOCUMENTS

| | | | |
|---|---|---|---|
| 2020/0028393 A1* | 1/2020 | Ravaud | H02K 41/031 |
| 2020/0052557 A1* | 2/2020 | Rubin | H02K 1/02 |
| 2021/0226488 A1* | 7/2021 | Pennington, III | H02P 25/03 |
| 2021/0249937 A1* | 8/2021 | Rubin | H02K 1/165 |

* cited by examiner

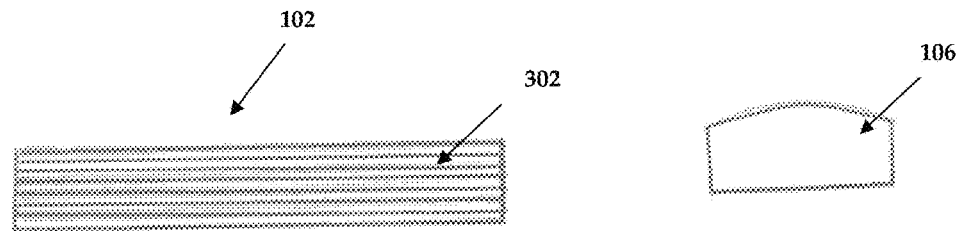
Figure 3
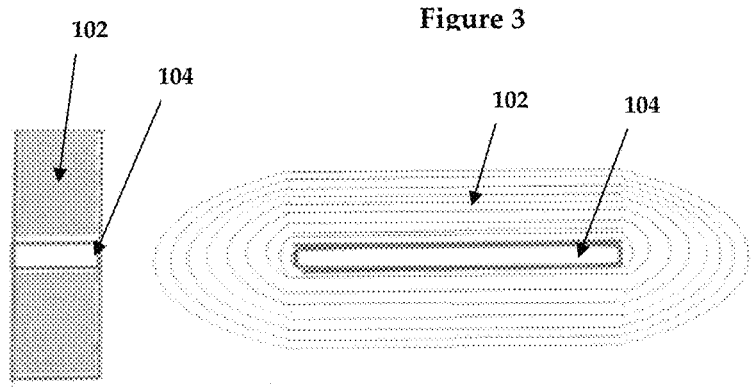
Figure 4
Figure 5
Figure 6
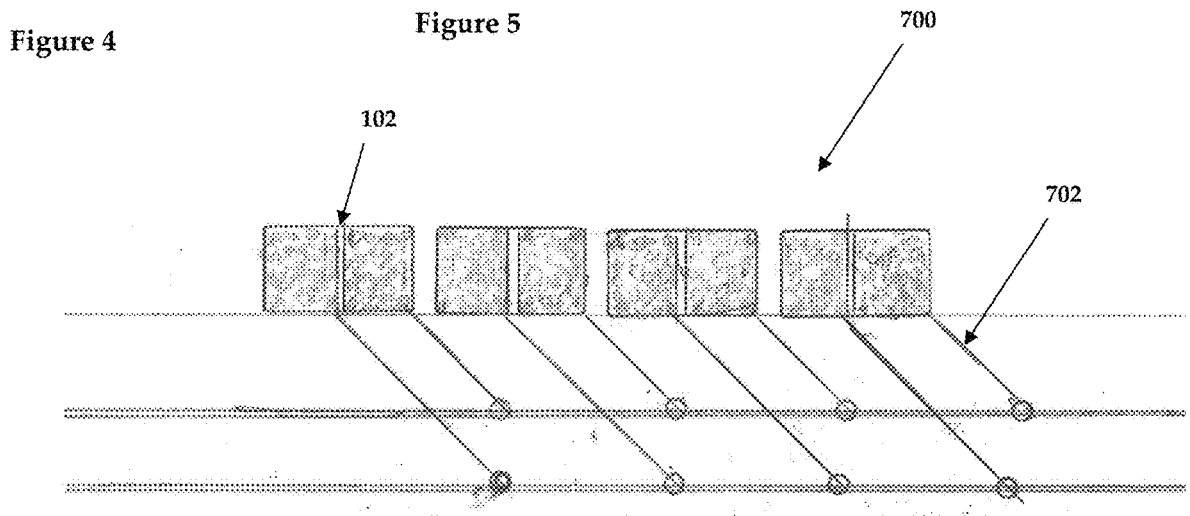
Figure 7

BLOCK-TYPE WINDINGS FOR IMPROVED ELECTRICAL GENERATORS

CROSS-REFERENCE TO RELATED APPLICATIONS

This application claims priority to U.S. Provisional patent applications Ser. No. 63/451,664 titled "Wind Powered Generator having block coils", filed on Mar. 13, 2023 the disclosure of which is herein incorporated by reference in its entirety.

PATENTS CITED

The following documents and references are incorporated by reference in their entirety, Liu Jinfeng CN105946594A, Berdut (U.S. Pat. No. 5,615,18) and Baca et al (U.S. Pat. No. 7,868,476).

FIELD OF THE INVENTION

The invention relates to enhanced composite lightweight windings, and specifically to lightweight and highly efficient composite material winding assemblies for electrical generators.

DESCRIPTION OF THE RELATED ART

Electric generators have windings comprised of conductive wires that are wrapped around a metallic core. The core for these windings has been traditionally made of iron. The conductive wires, typically made from copper, aluminum or a mixture, provide an electrical path for the current that is created as the windings are subjected to alternating magnetic fields to flow (whether those of a permanent magnet or those from electro-magnetic fields). To create these magnetic fields, the rotor or armature is spun.

While the use of ferromagnetic cores for the windings is traditional, these cores have two primary performance penalties. The first is their weight, the second is the induced magnetic polarity, resulting from the time the core is exposed to a N or S polarity of the permanent magnets while stopped. Both have been historically accepted penalties, but newer market requirements and applications, combined with the constant desire to improve efficiencies, have resulted in the need for alternatives.

What is required is an improved winding for generator applications where improved performance and lighter weight may be achieved.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about an electric generator comprising: a central rotor structure comprised of phenolic materials and magnetic field generating components, wherein said magnetic field generating materials are comprised of permanent magnets or electric magnets, a stator structure comprised of phenolic materials and block-type windings, a shaft connected to said rotor and coupled to external mechanical rotation components. In another aspect, said block-type windings are each comprised of a rectangular, flat top winding assembly formed by a tightly coiled conductive insulated wire dipped in a resin mounted along the interior surface of a phenolic ring surrounding said rotor, the ends of each said winding said insulated wire are connected to external electric outlets of said generator and electrical control circuits are included so that each said winding can be individually connected or disconnected of the generator load. In yet another aspect said winding wire is comprised of all or part of: copper, aluminum or a mixture of either. In another aspect, said block-type winding is wound around an air gap. In yet another aspect, said block-type winding is wound around a piece of phenolic material. In another aspect, said central rotor structure has a ferrous metal 'T' insert structure placed in the gap between the permanent magnets in the rotor. In another aspect, said central rotor structure is equipped only with N-pol or S-pol permanent magnets or electric magnets, resulting in a Direct Current output.

Other features and advantages of the present invention will become apparent upon examining the following detailed description of an embodiment thereof, taken in conjunction with the attached drawings, which are provided for purposes of illustration and not of limitation.

BRIEF DESCRIPTION OF THE DRAWINGS

FIG. 3 illustrates a side view of a proposed composite block winding for electrical generators, according to an exemplary embodiments of the invention.

FIG. 4 illustrates a side view of a proposed composite block winding for electrical generators, according to an exemplary embodiments of the invention.

FIG. 5 illustrates a top view of a proposed composite block winding for electrical generators, according to an exemplary embodiments of the invention.

FIG. 6 illustrates a side view of a permanent magnet for electrical generators, according to an exemplary embodiments of the invention.

FIG. 7 illustrates the electrical connection of the output of the proposed windings for electrical generators, according to an exemplary embodiments of the invention.

Figure 1:
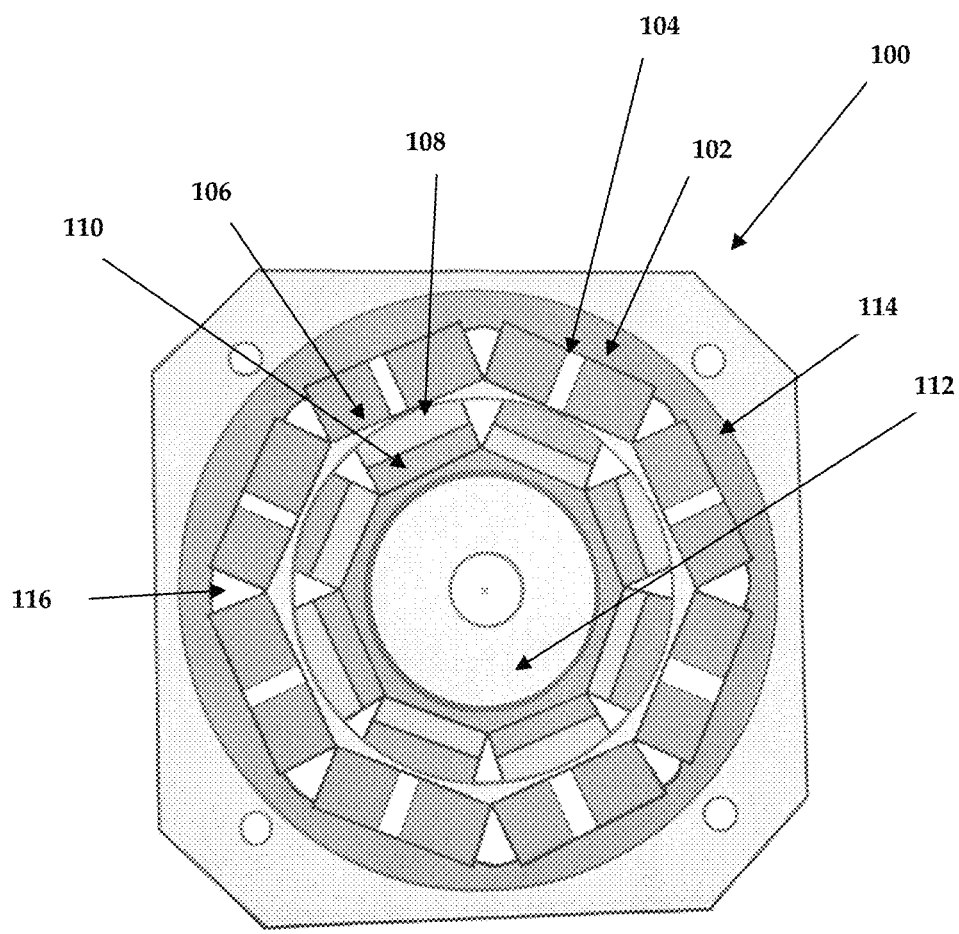
FIGS. 1 and 12 illustrate cross sections views of proposed generator using the proposed composite block windings, according to exemplary embodiments of the invention.
Figure 2:
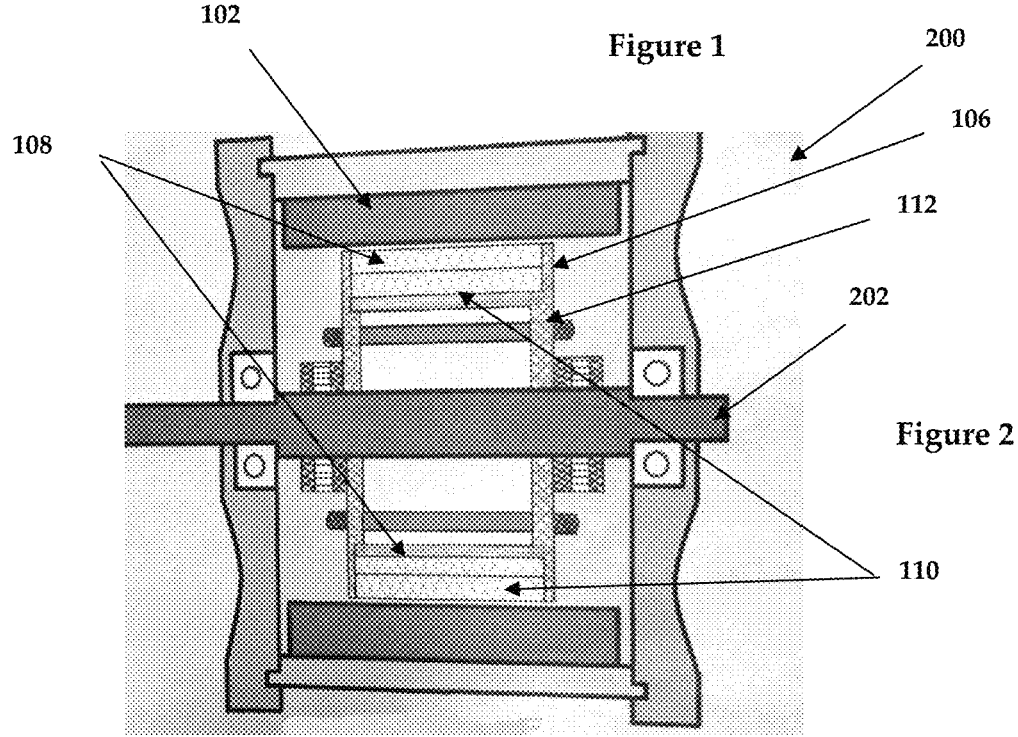
FIG. 2 illustrates a cross section side view of a proposed generator using the proposed composite block windings, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

The present invention, referring to FIGS. 1-6 illustrate the various embodiments of the proposed devices using the proposed composite or block-type windings 102. In one proposed embodiment, the generator 100 is comprised of a multiplicity of block-type windings 102, each comprised of an individual insulated wire 302 that is wound around a central area 104 and then covered in resin, so as to form a block 102. The wire 104 may be comprised of copper, aluminum or a combination.

The central area 104 of the winding 102 may be left open, or alternatively filled with a phenolic material or other possible preferably non-ferrous metals (again, copper, stainless steel, aluminum, lead), non-ferrous polymers (including amorphous as well as semi-crystalline plastics), ceramics, wood, fiberglass, carbon fiber composites, epoxy composites and others. Some of the trade names for the above materials include PromoSpire, Torlon, AvaSpire, Amodel and their competitors. Some of these phenolic materials are a usually thermosetting resins or plastics made by condensation of a phenol with an aldehyde and used especially for molding and insulating and in coatings and adhesives.

A principal part of the invention, is that the winding blocks 102 are rectangular and flat, presenting a 'flat' profile against a rotating rotor with either flat or domed permanent magnets 106, or with similar electric magnets. As mentioned, the central area 104 of the winding 102 may be left open or filled with a phenolic material. The central area 104 may assist in affixing the winding 102 to the stator 114 assembly.

In one embodiment 100, the wingdings 102 are attached to the stator 114, which itself may be comprised of phenolic materials. Similarly, all or parts of the rotor 112 are comprised of phenolic materials. We note, that particularly for generators, the almost complete elimination of ferrous metals has shown to have advantages.

Note that while the generator 100 has permanent magnets 106, with N-pol 108 or S-pol 110 polarity, a similar effect may be achieved by using electromagnets or electric magnets within the stator 114 or rotor 112. These electric magnets are powered so that the N-pol 108/S-pol 110 magnetic field is generated as the rotor 112 rotates, or alternatively a rotation is created by the variation of the magnetic field electronically.

In one embodiment, the rotor 112 is rotated via a mechanical coupling of the rotor shaft 202 to an external rotation component, such as a propeller hub, engine shaft, wheel axle, turbine (steam or jet) shaft, etc.

In one embodiment, 1000, the magnets 106 within the core are alternated in surface polarity, so that the N 108 occupies all the exposed surface from the magnet in the rotating core 112, while the next magnet position will be completely S-polarity 110. A side view of the permanent magnet 602 shows how the pieces will interact with each other.

As seen in the side view 200, the rotation of the rotor 112 moves the magnetic fields from the magnets 106 across the wires 302 within the winding 102, causing the voltage to be induced across the wire 302, which is then electrically connected outside the chassis 200.

The generator described above is capable of significant weight advantages, since the complete structure is made of lightweight non-ferrous and phenolic materials, instead of heavy ferrous metals. In addition, over time, ferrous metals tend to 'adopt' the magnetic polarity of whatever permanent magnet they are exposed to. Many of us have screwdrivers with 'adopted' magnetism, not always a desired quality.

Figure 12:
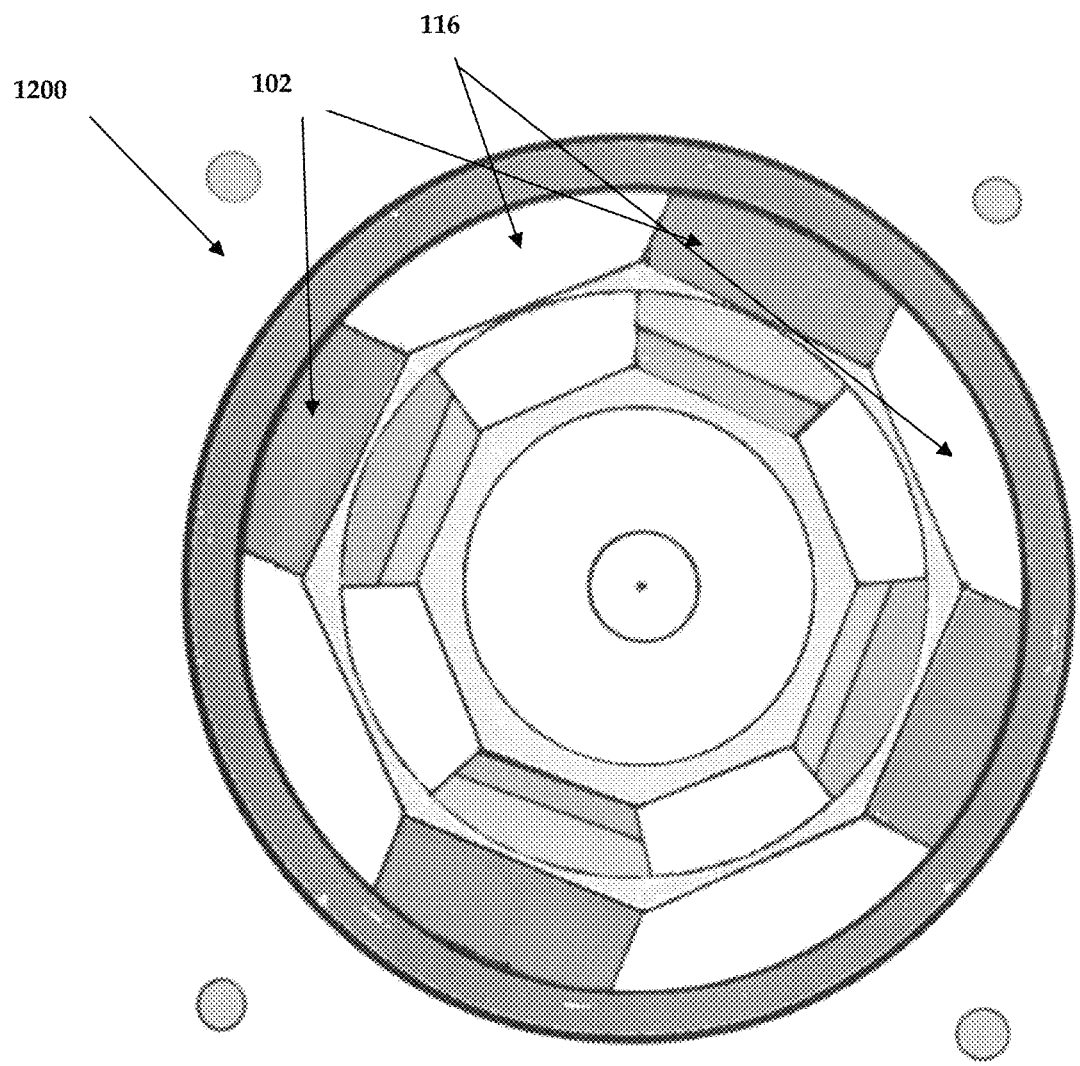

A particular feature of the 'block' windings 102, is their rectangular nature. While in other embodiments they may be curved to match the diameter of the rotor 112, in one embodiment they are flat and rectangular (as seen in 100), which leaves a number of gaps around the periphery of the stator 114. For mechanical reasons (FIG. 12), in one embodiment we fill these gaps between coils 102 out with phenolic materials 116.

Figure 8:
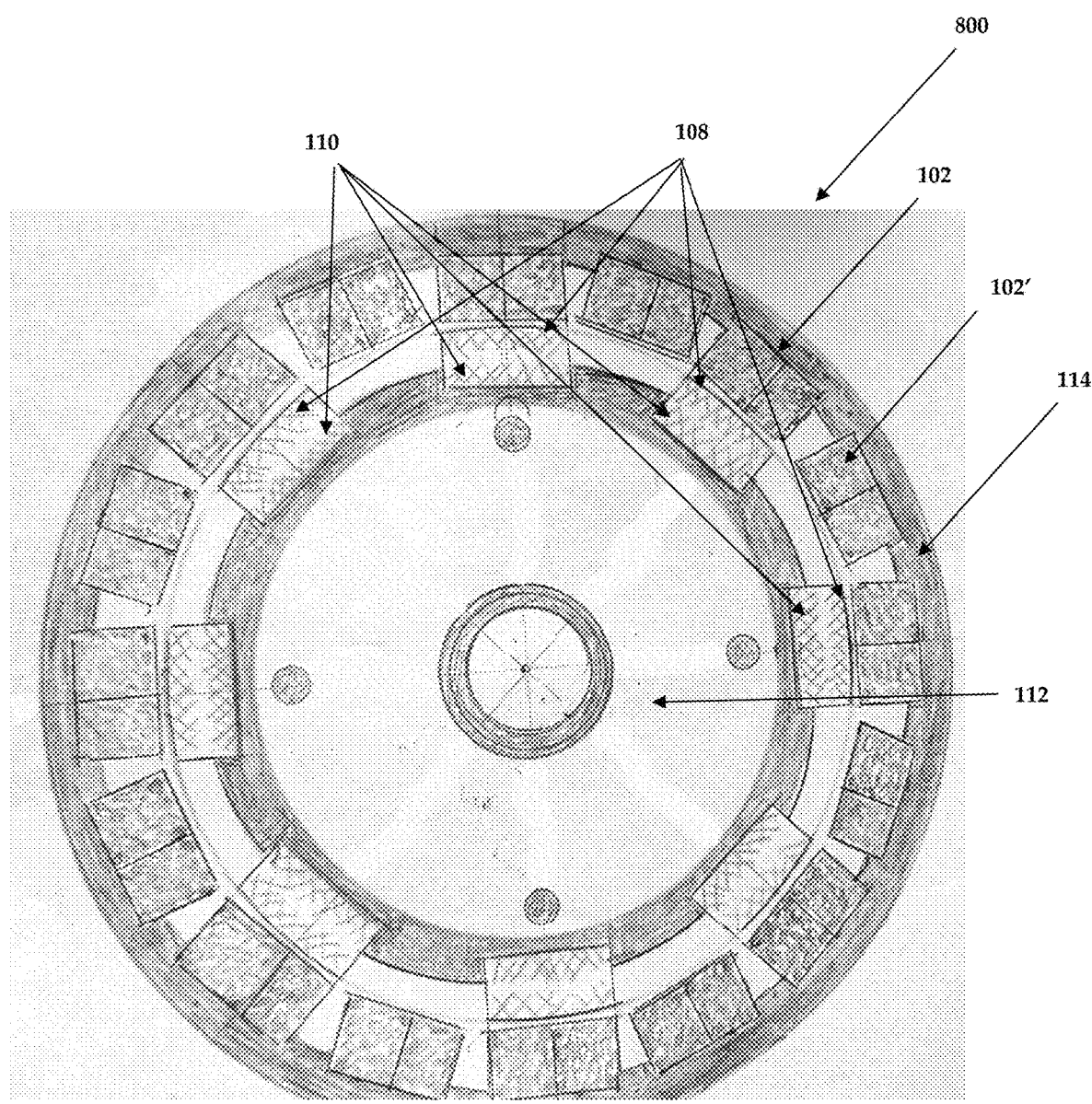
FIG. 8 illustrates a cross section view of a proposed DC generator using the proposed composite block windings, according to an exemplary embodiment of the invention.

In one embodiment 700, each of the windings 102 are treated as an individual generator (FIG. 7), producing an independent voltage and current, that may be combined 702 as it outputs the assembly 100, or simply left individually. In particular, this arrangement allows for an electronic shifting of the generator load via electronic means (such as an electronic switch or electro-mechanical one), so that the generation may be adjusted to the load capacity (e.g. light day winds in a wind generator driven system), without expensive gears and transmissions. Whether the output is DC (FIG. 8) or alternating (so as to generate AC voltages and currents) as the N-pol 108 or S-pol 110 magnets go by the windings 102.

In another embodiment (FIG. 8), a purely DC generator is created, by utilizing similar polarity magnets (say all N-pol 108 or electromagnets) within the rotor 112, which when rotated induce their magnetic field into the plurality of winding 102 within the stator 114 (or vice versa, it's just simpler to rotate the non-wired components, but not impossible to do so). This generates a DC voltage and current within each coil 102. We note that the winding without a magnet temporarily facing it (such as the case of 102'), may be replaced by phenolic block if desired.

Figure 9:
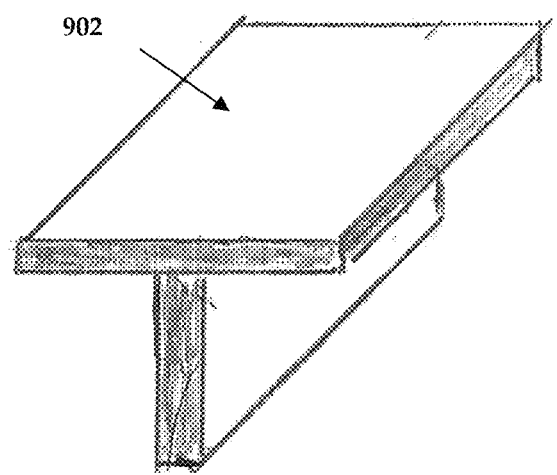
FIG. 9 illustrates a perspective view of an assistive ferrous material 'T', according to an exemplary embodiments of the invention.
Figure 10:
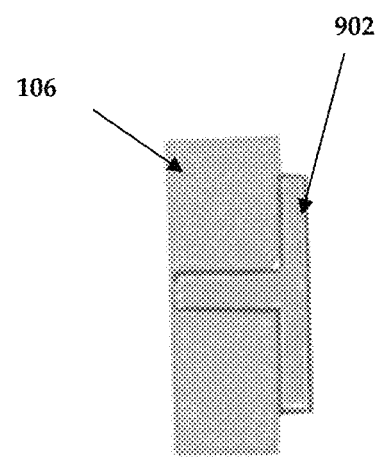
FIG. 10 illustrates a side view of a ferrous 'T' inserted within a permanent magnet, according to an exemplary embodiments of the invention.
Figure 11:
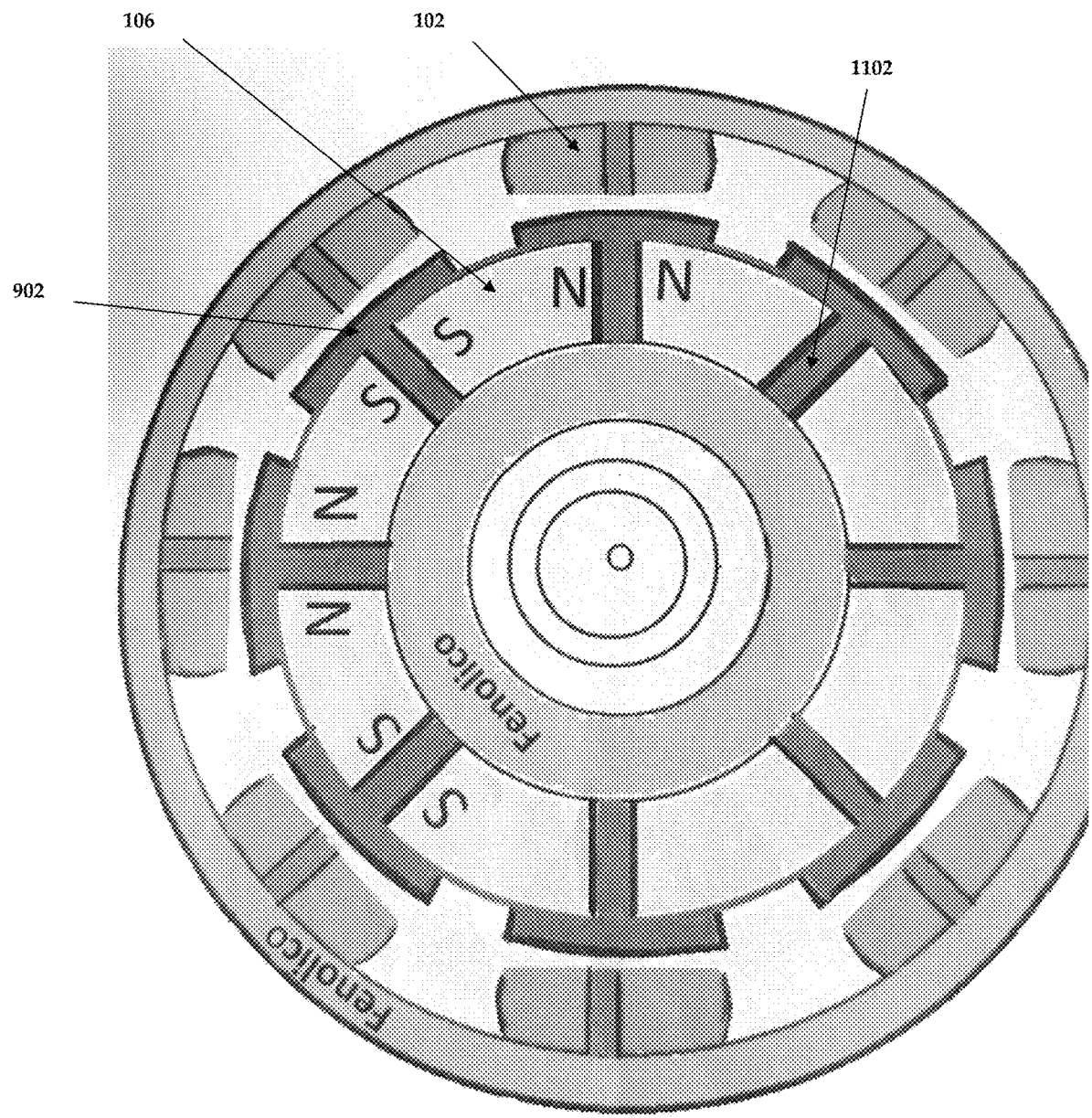
FIG. 11 illustrates a cross section view of a proposed AC generator using the assistive 'T's installed on the permanent magnets, according to an exemplary embodiment of the invention.

In some embodiments, the limited use of ferrous materials may be encouraged. Such is the case seen on FIGS. 9-11, where the use of ferrous 'T' inserts structures 902 placed between the permanent magnets gap 1102 (where the similar N-pol or S-pol of adjoining permanent magnets meet results in significant advantages, by having the 'T' portion of the insert match that of the winding, 'extending' the effective surface of the magnets 106 within the rotor so that magnetic area affecting the coils 102 surface is larger. In particular, this allows the surface area of the T insert to at one point match the area of the winding 102

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. An electric generator comprising:
    a central rotor structure comprised of phenolic materials and magnetic field generating components;
    wherein said magnetic field generating materials are comprised of permanent magnets or electric magnets;
    a stator structure comprised of phenolic materials and block-type windings;
    a shaft connected to said rotor and coupled to external mechanical rotation components;
    wherein said block-type windings are each comprised of a rectangular, flat top, flat bottom and flat sided winding assembly when viewed in an axial direction said winding assembly being formed by a tightly coiled conductive insulated wire that is wound in a smooth oval pattern with no sharp turns when viewed in a radial direction and then dipped in a resin, then further mounted along the interior surface of a phenolic ring surrounding said rotor;
    the ends of each said winding said insulated wire are connected to external electric outlets of said generator; and
    electrical control circuits are included so that each said winding can be individually connected or disconnected of the generator load.
2. The generator of claim 1 wherein:
    said winding wire is comprised of all or part of:
    copper, aluminum or a mixture of either.
3. The generator of claim 2 wherein:
    said block-type winding is wound around an air gap.
4. The generator of claim 2 wherein:
    said block-type winding is wound around a piece of phenolic material.
5. The generator of claim 1 wherein:
    said central rotor structure has a ferrous metal 'T' insert structure placed in the gap between the permanent magnets in the rotor.
6. The generator of claim 5 wherein:
    said winding wire is comprised of all or part of:
    copper, aluminum or a mixture of either.
7. The generator of claim 6 wherein:
    said block-type winding is wound around an air gap.
8. The generator of claim 6 wherein:
    said block-type winding is wound around a piece of phenolic material.
9. The generator of claim 1 wherein:
    said central rotor structure is equipped only with N-pol or S-pol permanent magnets or electric magnets, resulting in a Direct Current output.
10. The generator of claim 9 wherein:
    said winding wire is comprised of all or part of:
    copper, aluminum or a mixture of either.
11. The generator of claim 10 wherein:
    said block-type winding is wound around an air gap.
12. The generator of claim 10 wherein:
    said block-type winding is wound around a piece of phenolic material.

* * * * *